N. H. FREEMAN.
APPARATUS FOR RAISING WATER.
APPLICATION FILED OCT. 24, 1911.
1,034,703.
Patented Aug. 6, 1912.
3 SHEETS—SHEET 1.
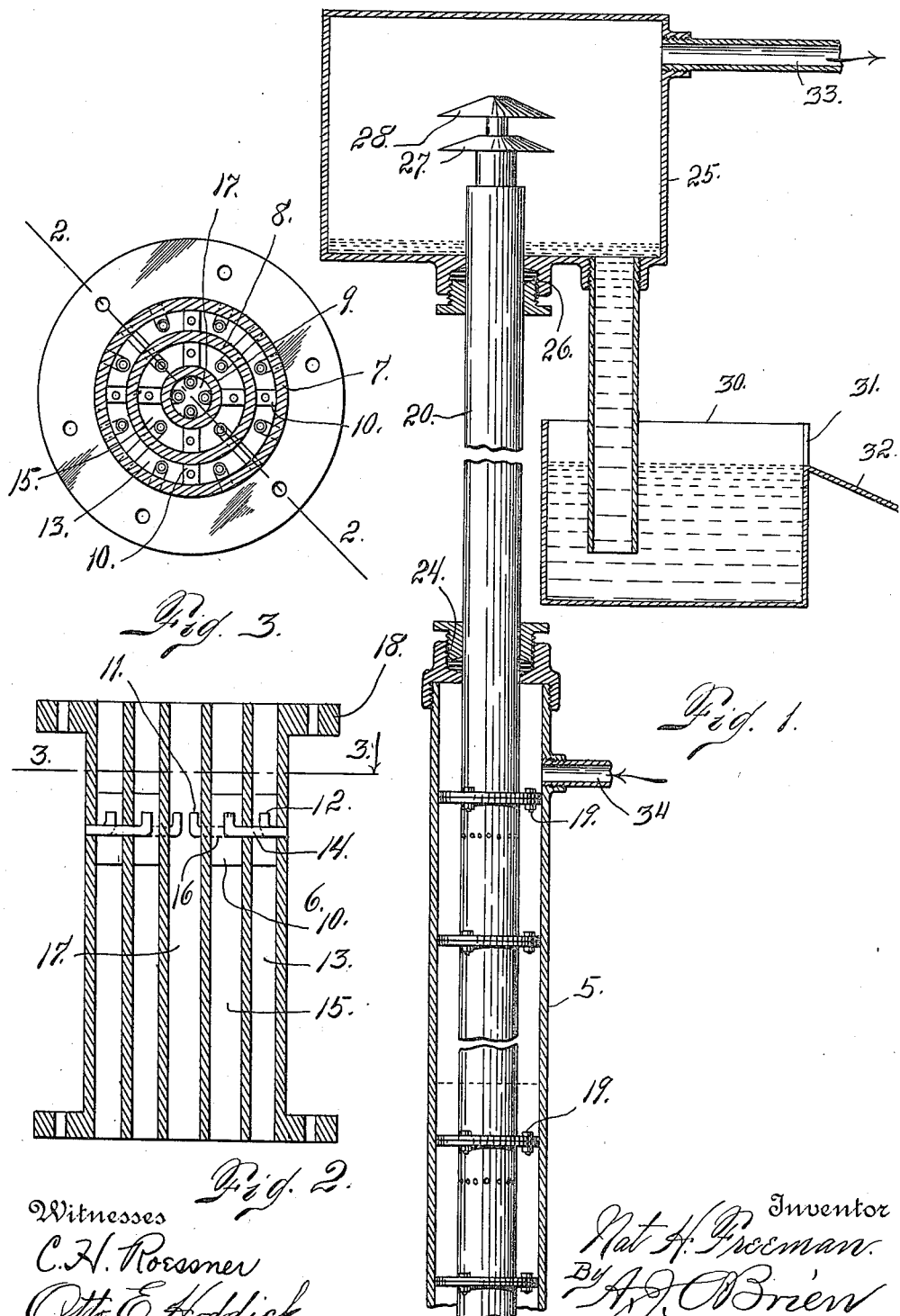

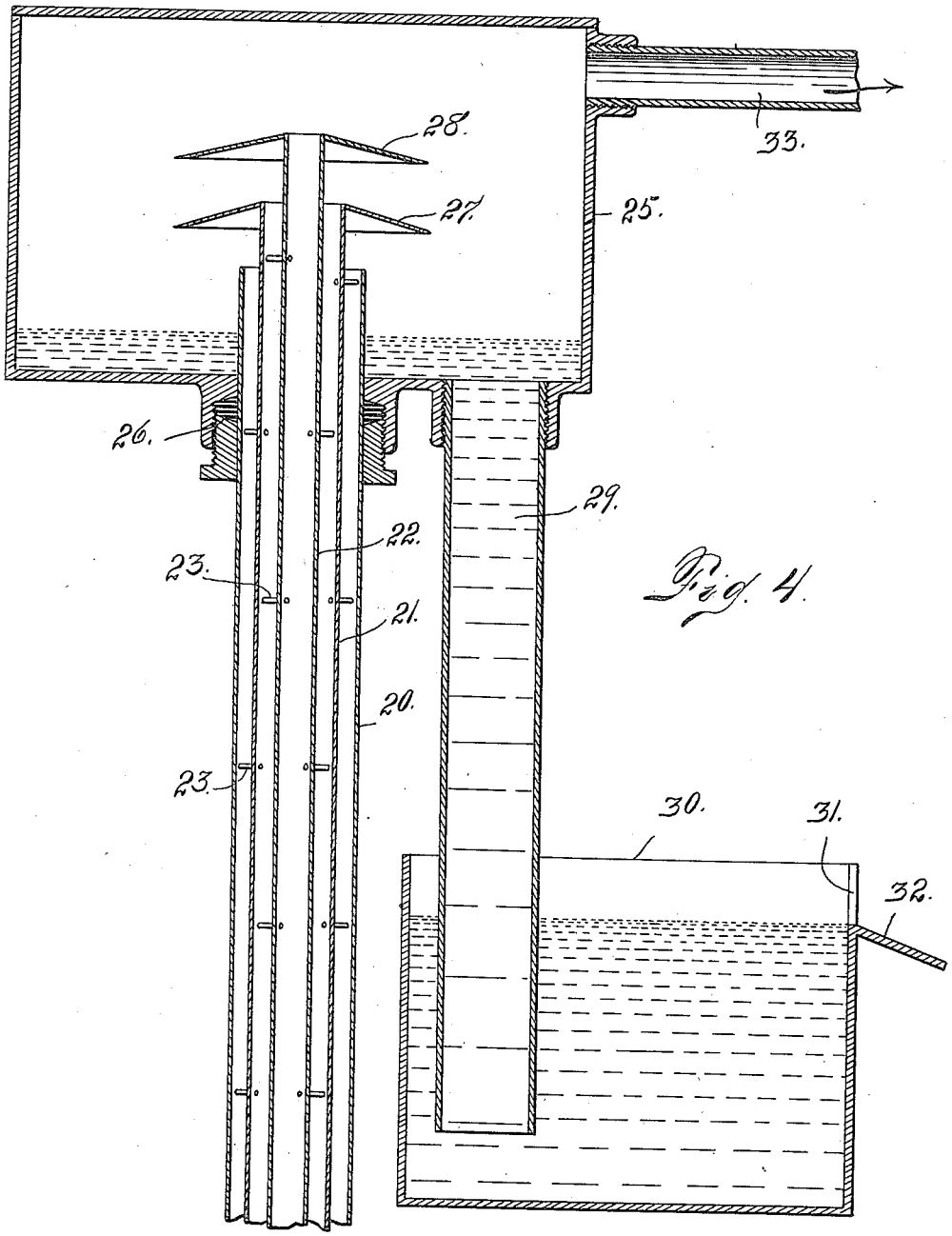

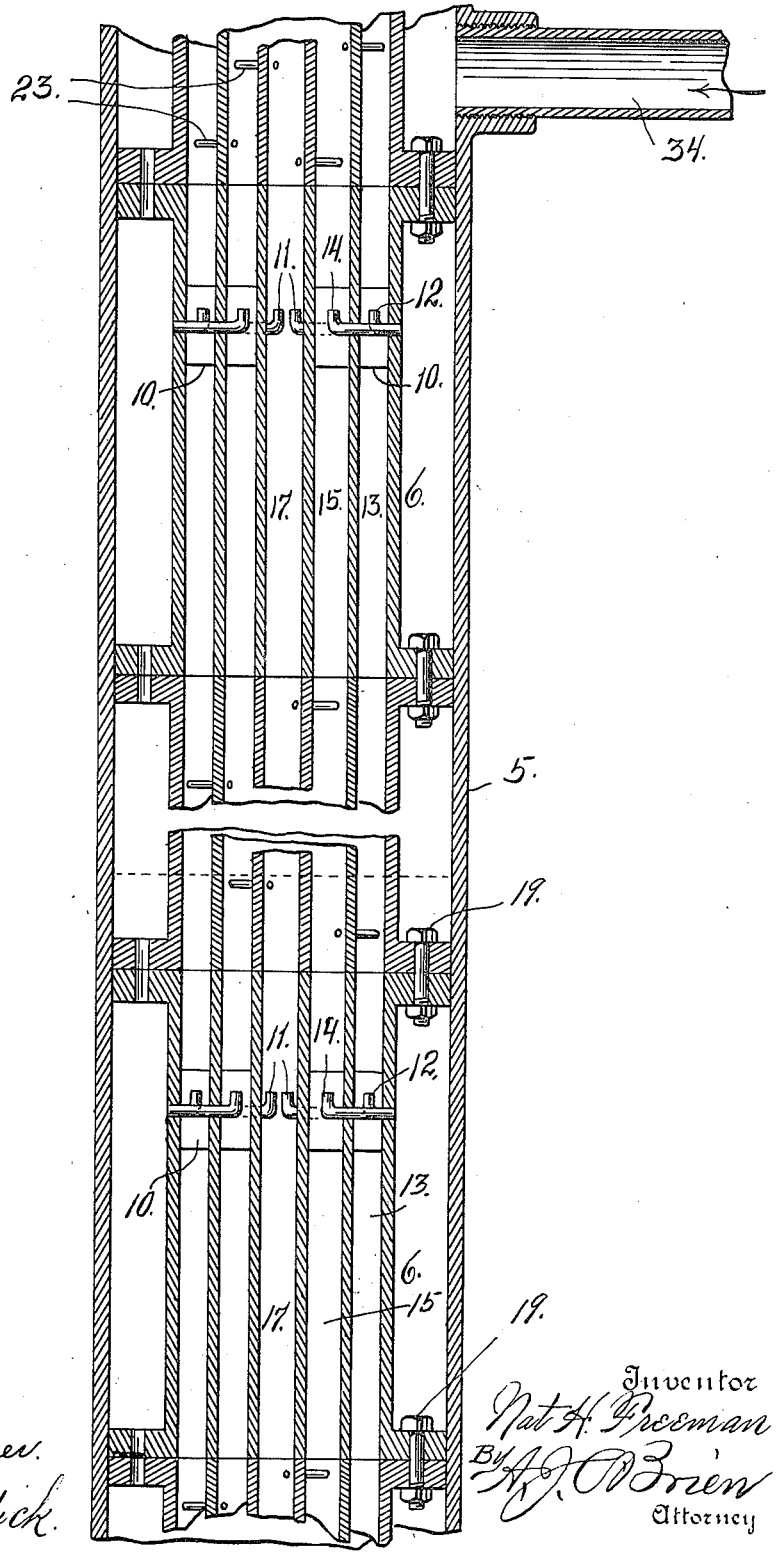

UNITED STATES PATENT OFFICE.

NAT H. FREEMAN, OF DENVER, COLORADO.

APPARATUS FOR RAISING WATER.

1,034,703.　　　　　Specification of Letters Patent.　　Patented Aug. 6, 1912.

Application filed October 24, 1911. Serial No. 656,522.

*To all whom it may concern:*

Be it known that I, NAT H. FREEMAN, a citizen of the United States, residing in the city and county of Denver and State of Colorado, have invented certain new and useful Improvements in Apparatus for Raising Water; and I do declare the following to be a full, clear, and exact description of the invention, such as will enable others skilled in the art to which it appertains to make and use the same, reference being had to the accompanying drawings, and to the characters of reference marked thereon, which form a part of this specification.
My invention relates to improvements in apparatus for raising water.

The principle upon which the apparatus operates, broadly stated, consists in introducing air into a standpipe located in a source of water supply, the air pressure serving to force the water into interiorly-located compartments of relatively small volume, the various compartments being in communication with the air under pressure by means of relatively small tubes for the introduction of small jets of air, which are mingled with the water in the various compartments as it passes upwardly therethrough under the force of the air pressure, the air mingling with the water, reducing its specific gravity to such an extent as to make it practicable to elevate the water by the employment of a relatively small expenditure of power.
In the construction of the apparatus, I prefer to employ a series of tubes concentrically arranged, one within the other, the tubes all being located in a standpipe in communication with the source of water supply, the tubes constituting the compartments having their lower extremities so located that they are at all times submerged in the source of supply, the said tubes having their lower extremities open whereby the air under pressure, delivered to the standpipe outside of the tubes, acts upon the water, which normally rises in the standpipe and tubes to the same level.

As the air pressure is introduced to the standpipe, it forces the water downwardly in the latter and causes it to rise within the concentrically-arranged tubes, the nozzles for the introduction of the air jets to the compartments formed by the tubes being so located that they are above the water in the standpipe. The upper extremities of the various compartments, through which the water is forced, are in communication with a recess into which the water passes from the open extremities of the said compartments, provision being made for exhausting the air from the said reservoir above the water.

Having briefly outlined my improved construction, I will proceed to describe the same in detail, reference being made to the accompanying drawing, in which is illustrated an embodiment thereof.

In this drawing: Figure 1 is a view partly in elevation and partly in section, illustrating my improved apparatus, the same being broken away at the bottom to indicate that the structure may be of any desired length. Fig. 2 is a sectional view of one member of a series of members of which the lower portion of the tubes, constituting the concentrically - arranged compartments, may be formed, the same being shown on a larger scale than in Fig. 1. This is a section, taken on the line 2—2 of Fig. 3. Fig. 3 is a horizontal section, taken through one of the said members, on the line 3—3 of Fig. 2. Fig. 4 is a sectional view of the upper part of the structure shown in Fig. 1, the parts being shown on a larger scale. Fig. 5 is a vertical section of the portion of the structure broken away in Fig. 4, shown, however, on a larger scale.

The same reference characters indicate the same parts in all the views.

Let the numeral 5 designate a standpipe, which may be of any desired depth, the lower extremity of the pipe being in communication with a source of water supply. Arranged within this standpipe in any suitable manner is a series of tubes, suitably spaced to form compartments of relatively small cross sectional volume, the said tubes within the standpipe being preferably composed of series of members 6 consisting of concentrically-arranged parts 7, 8 and 9, the part 7 being outermost, and, therefore, of the greatest diameter, the part 8 being next in size, and the part 9 smallest. These parts 7, 8 and 9 are spaced in any suitable manner.

As illustrated in the drawing, the spacing is formed by the employment of radially-arranged webs 10, the member 6 being formed of an integral casting with the webs in place. Extending from the outer surface of the outermost part 7 are nozzles 12, which extend to the outermost compartment 13. Other similar nozzles 14 extend from the outer surface of the section part 7 inwardly to the next compartment 15, while perforations 16 are formed in the webs 10 from the outer surface of the part 7 to the innermost compartment 17, small nozzles 11 in communication with these perforations extending upwardly in the compartment 17 for the introduction of air jets thereto. The other nozzles 12 and 14 also have their extremities turned upwardly within their respective compartments.

The various concentric compartments within the standpipe 5 are formed by arranging the members 6 one above another and connecting flanges 18 formed at both extremities of the outermost section part 7 by means of bolts 19 passed through registering perforations in the meeting flanges of adjacent members. In this way, the concentric compartments are made of any desired depth, the compartments of the various members registering to form continuous compartments the entire depth of the standpipe, or approximately so, the lower extremities of the compartment being submerged at all times in the source of water supply, as heretofore explained, while their upper extremities communicate with compartments formed of a number of pipes corresponding with the number of parts 7, 8 and 9 of which the various members 6 are composed. These pipe members, above the section 6, are designated 20, 21 and 22, referring to them in their order from the outermost, inwardly. These pipe members are arranged concentrically, one within the other, and spaced by the use of pins 23. In arranging the tubes, the tube or pipe 21 is equipped with pins 23, which project from its outer surface far enough to engage the inner surface of the outermost tube 20 for spacing purposes, while the innermost tube 22 is equipped with similar pins projecting from its outer surface and adapted to engage the outer surface of the tube or pipe 20, thus spacing the innermost tube 22 from the tube 21. The lower extremity of the member composed of the pipe sections 20, 21 and 22 is connected with the uppermost member 6 within the standpipe, the lower extremity of the outermost tube 20 being flanged for connection with the flange 18 of the uppermost section 6 by means of the bolts 19.

The pipe structure composed of the members 20, 21 and 22 passes through a stuffing box 24 located at the top of the standpipe, thus making an air-tight joint. Above the standpipe, the pipe structure projects into a reservoir 25, the pipe structure passing through a stuffing box 26 surrounding the opening through which the pipe member passes. The pipe parts 20, 21 and 22 have their upper extremities open within the reservoir for the escape of water, the open extremity of the outermost pipe being preferably lowermost within the reservoir, the upper extremity of the pipe part 21 projecting centrally above and being equipped with a deflecting flange 27 which extends outwardly beyond the upper extremity of the pipe part 20 to prevent the water from the pipe 20 from being driven above the top of the pipe 21. The upper extremity of the pipe 22 is equipped with a similar deflecting flange 28, located above the flange 27 and performing the same function with reference to the pipe 21.

From the bottom of the reservoir 25 an outlet pipe 29 leads downwardly to a reservoir 30 having an outlet opening 31 from which leads a chute 32. Connected with the upper extremity of the reservoir 25 is a pipe 33 which is connected with an air exhaust apparatus of any kind, as an air pump. By the use of the exhaust apparatus, the air is withdrawn from the reservoir 25 above the water and separated from the latter as it enters the reservoir. At the same time, a partial vacuum is produced within the reservoir, which aids in the raising of the water through the various compartments formed by the various members of the structure, as heretofore described.

Assuming that the structure is completed, the operation is as follows: Air under the necessary pressure is forced through an air inlet pipe 34 connected with the upper extremity of the standpipe and communicating with the compartment 35 within the standpipe and surrounding the outermost member of the pipe structure, through which the water in sub-divided volume is forced. While the flanges of the various members 6 within the standpipe may fill the latter or may be of the same diameter as the interior of the standpipe, these flanges are perforated to allow the air to pass downwardly in the standpipe and act upon the water within the said pipe. There is one row of air jet nozzles 12, 14 and 11 located always above the water level within the standpipe through which jets of air enter the compartments, through which the water is being raised, and these jets of air, mingling with the water in the several compartments, form air bubbles, thus breaking up the solid volume of the water and diminishing its specific gravity to such an extent that the power required to raise the water through the said compartments is greatly reduced. The extent of the reduction in specific gravity may be regulated as desired. It will be understood, however, that the greater the volume of air caused to mingle with the water in the various compartments, the less will be its specific gravity, and the less the expenditure of power necessary to raise the water to a given height.

Certain claims that can be read on the construction disclosed in this application are embodied in my copending application, Serial No. 656,521, filed October 24, 1911. These claims cover a standpipe, whose lower extremities are in communication with the source of water supply; a pipe structure located within the standpipe and forming a portion of the space within the pipe into a plurality of compartments, whose lower extremities are in communication with the source of water supply; a reservoir in which the upper extremities of the said compartments are located; the top of the standpipe being provided with a stuffing box surrounding the pipe structure, where it leaves the standpipe; the bottom of the reservoir being also equipped with a stuffing box where the said pipe structure enters the reservoir, and the latter being provided with a water outlet.

Having thus described my invention, what I claim is:—

1. The combination with a water supply source, of a standpipe whose lower extremity is in communication with said source, a plurality of pipes arranged one within the other within the standpipe, the outermost pipe being suitably spaced from the inner surface of the standpipe, and the various pipe members within the standpipe being suitably spaced from each other, whereby the space through which the water is to be raised is suitably subdivided, the lower extremities of the compartments formed by the said pipes being open and in communication with the water supply, and means for introducing air under pressure into the standpipe outside of the outermost pipe member, the pipe members constituting the compartments through which the water is to be raised being equipped with air jet nozzles, whose outer extremities are in communication with the air under pressure within the stand pipe, a reservoir with which the upper extremities of the compartments are in communication, and means for exhausting the air of the said reservoir above the water, substantially as described.

2. The combination with a standpipe, of a series of tubes located within the standpipe and arranged one within the other for subdividing a portion of the space within the standpipe, the said tubes being open at their lower extremities and in communication with a source of water supply in which the lower extremity of the standpipe is submerged, the various compartments formed by the said tubes being separately in communication with the air in the standpipe, means for introducing air under pressure to the standpipe for the purpose of causing the water to rise upwardly within the compartments formed by the said tubes, the upper extremities of the said compartments being open for the escape of the water and air mingled together, a reservoir into which the open extremities of the said tubes protrude, the said reservoir being provided with a water outlet, and means connected with the upper extremity of the reservoir for exhausting the air therefrom, a second reservoir located below the first-named reservoir and into which the outlet from the first-named reservoir projects whereby the lower extremity of the said outlet is water sealed, substantially as described.

3. In an apparatus of the class described, the combination of a standpipe, having its lower extremity in communication with the source of water supply, a series of tubes located within the standpipe and arranged one within another, the outermost tube being suitably spaced from the inner surface of the standpipe, while the individual members of the series of tubes are suitably spaced from one another, the various compartments formed by the tubes being in communication with the standpipe for the entrance of relatively small jets of air, the tubular members within the standpipe being composed of a series of sections arranged one above another and suitably connected, the tubes constituting the uppermost section or member passing through the top of the standpipe, means for forming an air-tight joint at the top of the standpipe around the outermost tube of the series, a reservoir into which the upper open extremities of the tubes protrude, the opening where the tubes enter the reservoir being provided with a stuffing box to form a fluid-tight joint, the reservoir having a suitable outlet for the water and being connected with apparatus for exhausting the air from the reservoir above the water, substantially as described.

In testimony whereof I affix my signature in presence of two witnesses.

NAT H. FREEMAN.

Witnesses:
  F. E. BOWEN,
  A. EBERT O'BRIEN.